June 4, 1946.　　　C. S. BEDNASH　　　2,401,327
INDICATOR
Filed March 5, 1943　　　2 Sheets-Sheet 1
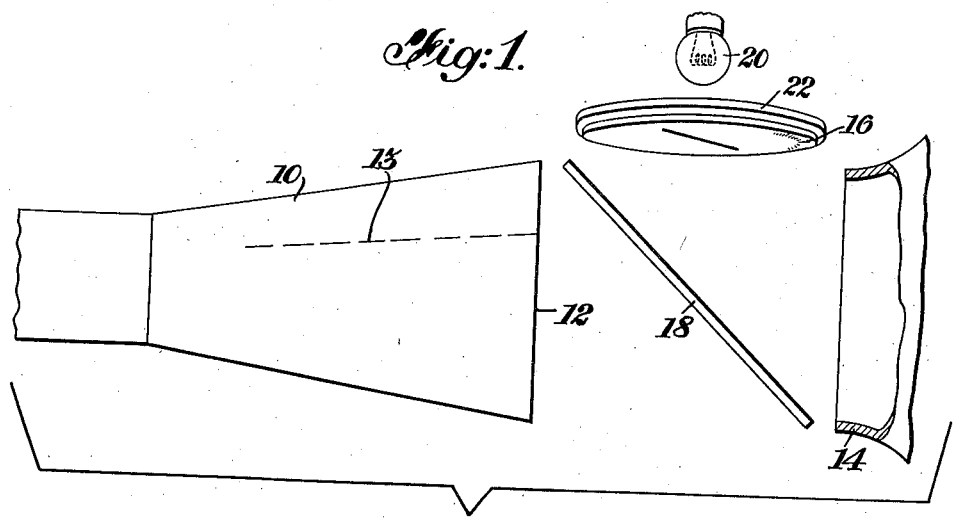
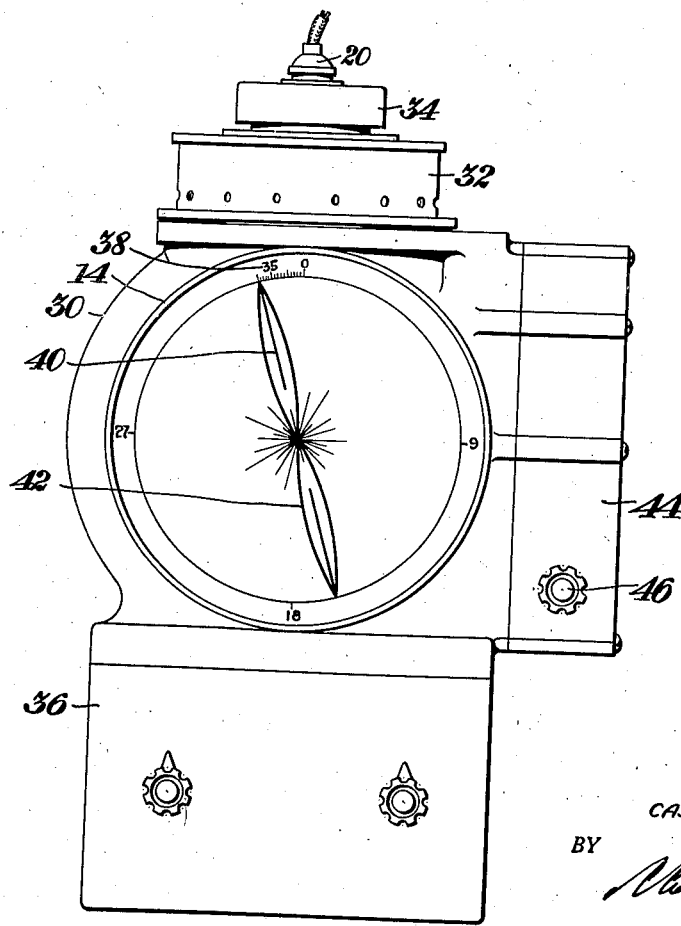
INVENTOR.
CASPER S. BEDNASH
BY
ATTORNEY June 4, 1946.   C. S. BEDNASH   2,401,327
INDICATOR
Filed March 5, 1943   2 Sheets-Sheet 2
Fig.3.
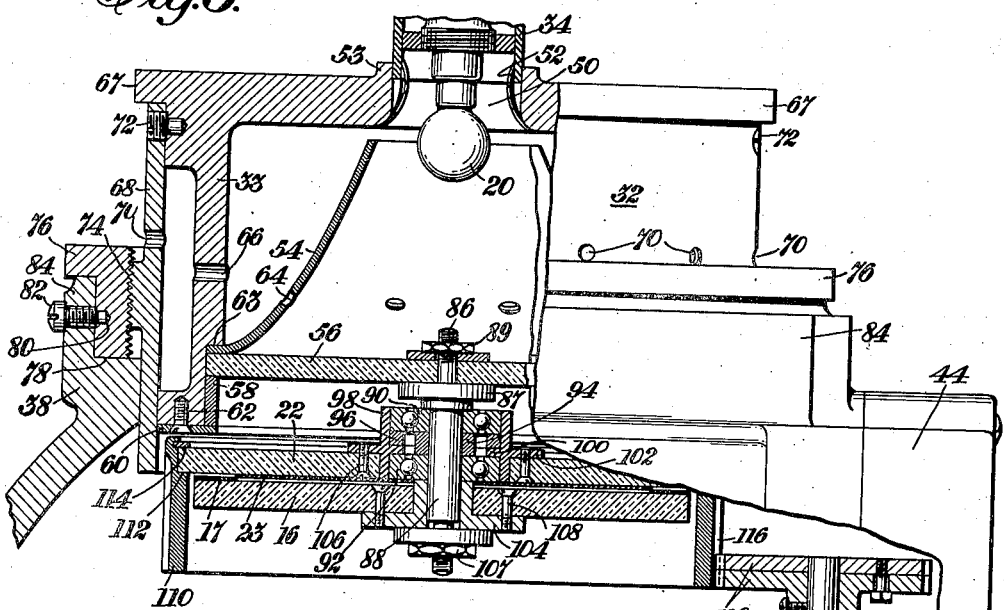
Fig.4.
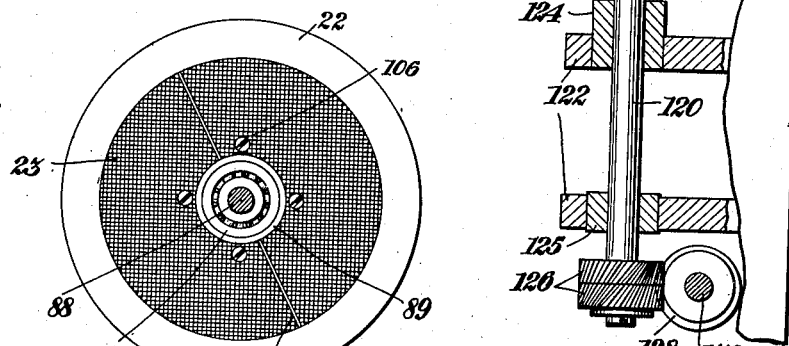
Fig.5.
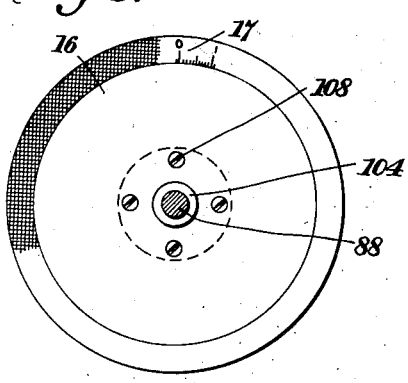
Fig.5A.
INVENTOR.
CASPER S. BEDNASH
BY
ATTORNEY Patented June 4, 1946

2,401,327

UNITED STATES PATENT OFFICE 2,401,327

INDICATOR

Casper S. Bednash, Jersey City, N. J., assignor to Federal Telephone and Radio Corporation, Newark, N. J., a corporation of Delaware Application March 5, 1943, Serial No. 478,097

1 Claim. (Cl. 116—129)

This invention relates to improvements in indicators, and more particularly to a novel arrangement for a scale and alidade adapted for use in indicating the position of the pattern on a cathode ray tube screen.

An object of this invention is to provide a novel alidade construction.

Another object of this invention relates to a novel scale and alidade unit.

A further object of this invention is directed to a novel arrangement for providing an alidade for use with the screen of a cathode ray tube.

Other objects and advantages of the present invention will appear from the following description of a preferred embodiment thereof, illustrated in the accompanying drawings in which:

Fig. 1 is a schematic view illustrating the use of an indicator in accordance with the present invention with a cathode ray tube;

Fig. 2 is a front elevation of a cathode ray tube indicator embodying the indicator of the present invention;

Fig. 3 is a vertical view, partially in section, illustrating the scale and alidade unit of the present invention;

Fig. 4 is a plan view of the alidade used in the construction illustrated in Fig. 3;

Fig. 5 is a plan view of the scale adapted to be used with the alidade shown in Fig. 4;

Fig. 5A is an enlarged partial view of the scale illustrated in Fig. 5.

In radio indication and direction indicating systems of the type in which the detected signal impressed on a cathode ray tube is indicated by a cyclic trace on the screen of that tube, a scale is required to determine the relative position of the trace in order that the direction of the incoming signal can be readily determined. For the sake of accuracy, it is also advisable, if possible, to provide an alidade by means of which the direction of the cyclic trace can be more exactly determined on the scale. An arrangement whereby the image of a suitable scale may be viewed together with the trace on the screen of the cathode ray tube through the use of a film interposed between a viewing frame on the one hand and the screen of the cathode ray tube and the scale on the other hand has already been proposed, for example, in the copending application of Henri G. Busignies, S. N. 402,777, filed July 17, 1941. In the system therein proposed, however, no provision for an alidade has been made. It is one of the primary purposes of the present invention to provide a construction of the type disclosed in the aforesaid Busignies application which includes provision of an alidade for greater accuracy in reading.

Fig. 1 illustrates schematically the general subjects matter of the present invention as applied, by way of example, to a viewing system such as disclosed in the aforementioned Busignies application. In this figure the cathode ray tube which traces the desired indicating pattern is generally shown at 10, while the moving beam forming the pattern upon the screen 12 at the end of the tube is indicated at 13. The viewing frame is shown at 14 while a scale 16 is positioned above an angularly disposed film 18 interposed between the screen 12 and the viewing frame 14. A light source 20 positioned above the scale 16, illuminates the same, projecting it upon the film 18, and from the viewing frame 14 the image of the scale 16 appears to surround the end of the screen 12 thus, to the observer, permitting a computable reading of the position of the trace. In accordance with the present invention, and in a manner to be described in more detail hereinafter, I have also provided an alidade 22 between the scale 16 and the light source 20, the image of which is also projected upon the film 18 and which image is also observed through the viewing frame 14. Means to be described later are provided for rotating the alidade 22 as desired.

A general view of the apparatus in front elevation is shown in Fig. 2. In this case the housing for the cathode ray tube, which also includes the angularly positioned film 18 and supports the viewing frame 14, is indicated at 30. Upon this is mounted another housing 32 which contains the scale and alidade, and upon this is positioned a housing 34 for the light source 20. Below the housing 30 may be mounted a control panel 36 for controlling the cathode ray tube itself, while to one side of the housing 30 is attached a supplementary housing 44 containing apparatus for controlling the position of the alidade. A control knob 46 projecting from the housing 44 may be the actual alidade positioning device. As viewed from the viewing frame 14, the observer will see the image of the scale 16 projecting at 38, the image of the alidade 40, which may be rotated as desired and the trace 42 formed by the cathode ray tube 10. In the position shown, the alidade 40 is illustrated as bisecting the trace 42, whereby the accurate reading of the position of the trace on the image of the scale can be obtained.

The structural arrangement of the scale and alidade unit of the present invention can be more clearly determined from Figs. 3, 4, 5 and 5A. Fig. 3 which shows the relationship of the various parts one to the other, discloses the alidade and scale housing 32 to be provided with a hollow casing 33 having a centrally disposed opening 50 in its top, over which is mounted the light housing 34, the light source 20 projecting downwardly to within the casing 33. Means such as spring arms 52 attached about the openings 50 may serve to removably attach the housing 34 to the casing 33 by pressing the former against a suitable ring 53, attached about the upper rim of the opening 50. Within the casing 33 and positioned partially about the light source 20 is a light-directing shield 54. Beneath the shield 54 is positioned a light-diffusing screen 56. The light shield 54 and the diffusing screen 56 are held in place within the housing 32 by means of a spacing ring 58 and an end ring 60, attached to the bottom of the casing 33 and pressing the ring 58, the outer edge of the screen 56 and the lower outer edge of the shield 54 against an internal annular shoulder 63. In order to permit escape of heat caused by the light source 20, the shield 54 and the casing 33 may each be provided with a plurality of openings 64 and 66 respectively.

The upper end of the casing 33 is provided with a flange 67 which rests upon the upper edge of a generally cylindrical member 68. The casing 33 may be secured to the cylindrical member 68 by suitable means such as screws 72, while the outer surface of the member 68 is provided with an integral narrow externally threaded ring 74 engaging an internally threaded collar 76 which rests upon a shoulder 78 of the cathode ray tube housing 38. Radial displacement between the collar 76 and the cathode ray tube housing 38 is prevented by the upwardly extending annular flange 84 which closely surrounds the periphery of the collar 76. Upward movement of the collar 76 relatively to the cathode ray tube housing 38 is prevented by the provision of an annular groove 80 about the outer surface of the collar 76 into which groove projects one or more screws 82, extending through the upwardly directed flange 84. It will be seen, however, that rotation of the collar 76 on the shoulder 78 of the housing 38 is permitted and that through the threaded connection between cylindrical member 68 and the collar 76, rotation of the latter will act to raise or lower the entire housing 32 containing the light source, alidade and scale. Reference to Fig. 1 will show the advantage of this adjustment; various types of cathode ray tubes may vary in screen position, and raising or lowering the scale and alidade will permit a change in the position of their images as seen through the viewing frame. Suitable means such as a slot and key (not shown) may be used to prevent relative rotation between the cylindrical member 68 and the housing 38, upon rotation of the collar 76. The cylindrical member 68 may be provided with a series of openings 70, to permit the escape of heat from within the casing 33.

In accordance with the present invention, the scale and alidade are both supported from the light-diffusing screen 56. This is accomplished by means of a centrally positioned threaded stud 86 rigidly attached to the center of the light-diffusing screen 56 between a collar 87 and a nut 89. Over the stud 86 and below the collar 87 is mounted a bushing 88 to which are rigidly attached the inner races of ball-bearings 90 and 92. The ball-bearings are longitudinally spaced from one another by means such as collar 94 and ring 96 as well as by an interposed inwardly directed flange 100 of an outer collar 98 rigidly fastened to the outer races of the respective ball-bearings.

The collar 98 is also provided with an outwardly radially directed flange 102 to which is attached by suitable means such as screws 106, the alidade 22. Beneath the lower ball-bearing 92 and also mounted about the bushing 88 is a flanged collar 104 to which is attached as by screws 108, the stationary scale 16. A second nut 107 on the lower end of the threaded stud 86 tightens flanged collar 104, the inner races of both ball-bearings and the collar 87 against the lower face of the light-diffusing screen 56.

It will be seen from the aforedescribed, that while the scale 16 is stationary, the alidade 22 is rotatable about the bushing 88 through the intermediation of the ball-bearings 90 and 92. For the purpose of controlling the position of the alidade, the latter is fitted against an internal annular shoulder 112 of a cylindrical member 110 and held in place against this shoulder by means such as spring ring 114. The outer surface of the cylindrical member 110 is provided with gear teeth 116 which are engaged by a pair of gears 118 mounted upon a generally vertical shaft 120. The gears 118 may be sprung relatively to one another in a manner well-known in the art to prevent backlash and thus, increase the accuracy of the alidade control system. The control housing 44 may be provided with a pair of spaced bearing guides 122 for the shaft 120, and the shaft is maintained in proper vertical position by means such as collars 124 and 125. At the lower end of the shaft 120 is provided a second set of gears 126, which may also be sprung relatively to one another, and which are engaged by a worm 128 on control shaft 130. The control knob 46 of Fig. 2 may be attached on the outside of the housing 44 to the shaft 130.

The alidade and scale themselves, illustrated in Figs. 4, 5 and 5A, will be described in more detail for the sake of clarity. As the alidade 22, I prefer to use a circular disk of light-transmitting material, such as glass or one of the well-known transparent synthetic resins. The center portion of the disk is covered with an opaque material such as black paint 23 leaving, however, a straight opening across the band through which light may pass and which serves as the alidade indicia 40. The outer border of the alidade 22 is left transparent for a purpose which will be immediately made clear. The scale shown in Figs. 5 and 5A, likewise, preferably consists of a disk of transparent material, the central portion of which is maintained transparent, but the border of which is covered with an opaque material such as black paint, upon which are etched through or otherwise formed the suitable scale indicia. It will be noted that the inner diameter of the opaque section of the scale is the same as the outer diameter of the opaque section of the alidade, whereas, the transparent portion of the alidade is overlapped by the opaque section of the scale. Thus, when the scale and alidade are positioned closely adjacent one another with a light source on one side, in the manner shown in Fig. 3, the resultant image which will appear upon viewing the scale and alidade from the side opposite the light source will show an illuminated scale within which is a rotatable illuminated alidade. When this combination is projected upon the film, as in Fig. 1, the observer looking through the viewing frame 14 will see the image of the illuminated alidade 40 surrounded by the illuminated scale 38, and within the scale, the trace 42 of the cathode ray beam. When a trace has once been fixed upon the screen for a particular reading, rotation of the control knob 46 will, as particularly described in connection with Fig. 3, rotate the alidade 22, thereby similarly rotating the alidade image line 40 until as desired it may be moved to bisect the cathode ray image and provide an accurate reading to the observer.

While I have described my invention with some particularity in order to comply with the patent statutes, it will at once be clear to those skilled in this art that various changes may be made therein without departing from the scope of the invention. For example, many of the constructional details, particularly as illustrated in Fig. 3, while assisting in the design of an extremely accurate alidade are not in themselves to be considered as essential parts of the invention. In the alidade and scale constructions themselves, while I prefer to obtain desired alidade and scale images by covering transparent artificial resinous disks with black paint having suitable indicia inscribed thereto, this paint could, if desired, be replaced by other means such as suitably perforated thin metal disks. It is also possible by recent processes to form artificial resinous plates which are partially transparent and partially opaque in a unitary structure. Disks of this nature could be utilized in place of those specifically described. Furthermore, while the invention is particularly adapted for use in determining the position of a trace in a direction finding system utilizing a cathode ray tube, the provision of the described scale and alidade is obviously adapted for use with cathode ray tubes employed in other systems. It is also pointed out that the indicator comprising my novel scale and alidade arrangement, is a construction novel per se, whether used in connection with a cathode ray tube or for some other indicating purpose.

Accordingly, while I have described above the principles of my invention in connection with specific apparatus, it is to be clearly understood that this description is made only by way of example and not as a limitation on the scope of my invention as set forth in the objects and the accompanying claim.

I claim:

In an indicator device, a scale comprising a sheet of transparent material, opaque material mounted on and forming a border about said transparent sheet, said opaque material having openings therein spaced about the periphery of said sheet to form suitable indicia for said scale, and an alidade positioned closely adjacent said scale, said alidade comprising a sheet of transparent material, and opaque material about the center of said sheet and of such size that the outer edge of the opaque material on the alidade is substantially aligned with the inner edge of the opaque material on said scale, the opaque material on said alidade having a straight narrow slot therein extending across the same from one edge to the other, whereby the transparent center of said scale is covered by the slotted opaque center of the alidade and the transparent edge of the alidade is covered by the opaque border of the scale having indicia openings therein, means for mounting said scale and alidade relatively movable to one another, a light source mounted in juxtaposition to said scale and alidade to illuminate the indicia on said scale and the slot on said alidade, said mounting means including a stationary shaft, means for adjustably attaching said scale to said stationary shaft, and bearing means for rotatably supporting said alidade on said shaft, a hollow cylinder attached about the periphery of said alidade, gear teeth formed about the outer surface of said cylinder, and gear means engaging said teeth for rotating said cylinder and alidade.

CASPER S. BEDNASH.